United States Patent [19]
Ooyagi et al.

[11] Patent Number: 5,303,396
[45] Date of Patent: Apr. 12, 1994

[54] DIVERSITY RECEPTION HAVING A PLURALITY OF ANTENNAS FOR USE WITH MOVING VEHICLES

[75] Inventors: Kazuhiro Ooyagi, Yokohama; Nobutaka Hotta, Fujisawa; Keiro Shinkawa, Hiratsuka, all of Japan

[73] Assignees: Hitachi, Ltd., Tokyo; Hitachi Video & Information Systems, Inc., Yokohama; Hitachi Automotive Engineering Co., Ltd., Ibaraki, all of Japan

[21] Appl. No.: 710,811

[22] Filed: Jun. 5, 1991

[30] Foreign Application Priority Data

Jun. 13, 1990 [JP] Japan .................. 2-152792

[51] Int. Cl.⁵ .............................. H04B 17/02
[52] U.S. Cl. .................................. 455/134; 455/136; 455/140; 455/277.2; 348/725
[58] Field of Search .......... 455/134, 136, 140, 277.1, 455/277.2; 358/188; 375/100

[56] References Cited

U.S. PATENT DOCUMENTS

| | | |
|---|---|---|
| 4,317,229 | 2/1982 | Craig et al. ............. 455/277.1 |
| 4,433,344 | 2/1984 | Gradin et al. ........... 455/277.1 |
| 4,704,734 | 11/1987 | Menich et al. .......... 455/277.2 |
| 5,056,153 | 10/1991 | Taniguchi et al. ...... 455/277.1 |

FOREIGN PATENT DOCUMENTS

| | | |
|---|---|---|
| 2815670A1 | 11/1978 | Fed. Rep. of Germany . |
| 3510580A1 | 9/1986 | Fed. Rep. of Germany . |
| 57-14224 | 1/1982 | Japan . |
| 57-12733 | 8/1982 | Japan . |

*Primary Examiner*—Reinhard J. Eisenzopf
*Assistant Examiner*—Andrew Faile
*Attorney, Agent, or Firm*—Antonelli, Terry, Stout & Kraus

[57] ABSTRACT

A diversity reception apparatus which has a plurality of antennas and in which one of the antennas having the best receiving condition is automatically selected and connected to a broadcasting signal receiver. The diversity reception apparatus has a feature in that after demodulated signals, obtained by the receiver respectively corresponding to the plurality of antennas, are converted into digital signals by an A/D converter, the best demodulated signal and the antenna corresponding thereto are selected by comparing the digital signals with each other, and that the width of a switch driving pulse from a switch driving pulse generator is made not more than 3 µs.

2 Claims, 8 Drawing Sheets

DIVERSITY RECEPTION HAVING A PLURALITY OF ANTENNAS FOR USE WITH MOVING VEHICLES

BACKGROUND OF THE INVENTION

The present invention relates to a diversity reception apparatus having a plurality of antennas, in which one of the antennas, which is in the best receiving condition is automatically selected and is subsequently connected to a broadcasting signal receiver. The invention particularly relates to a diversity reception apparatus suitable for application to a television receiver mounted on a mobile body such as a car.

Figure 3:
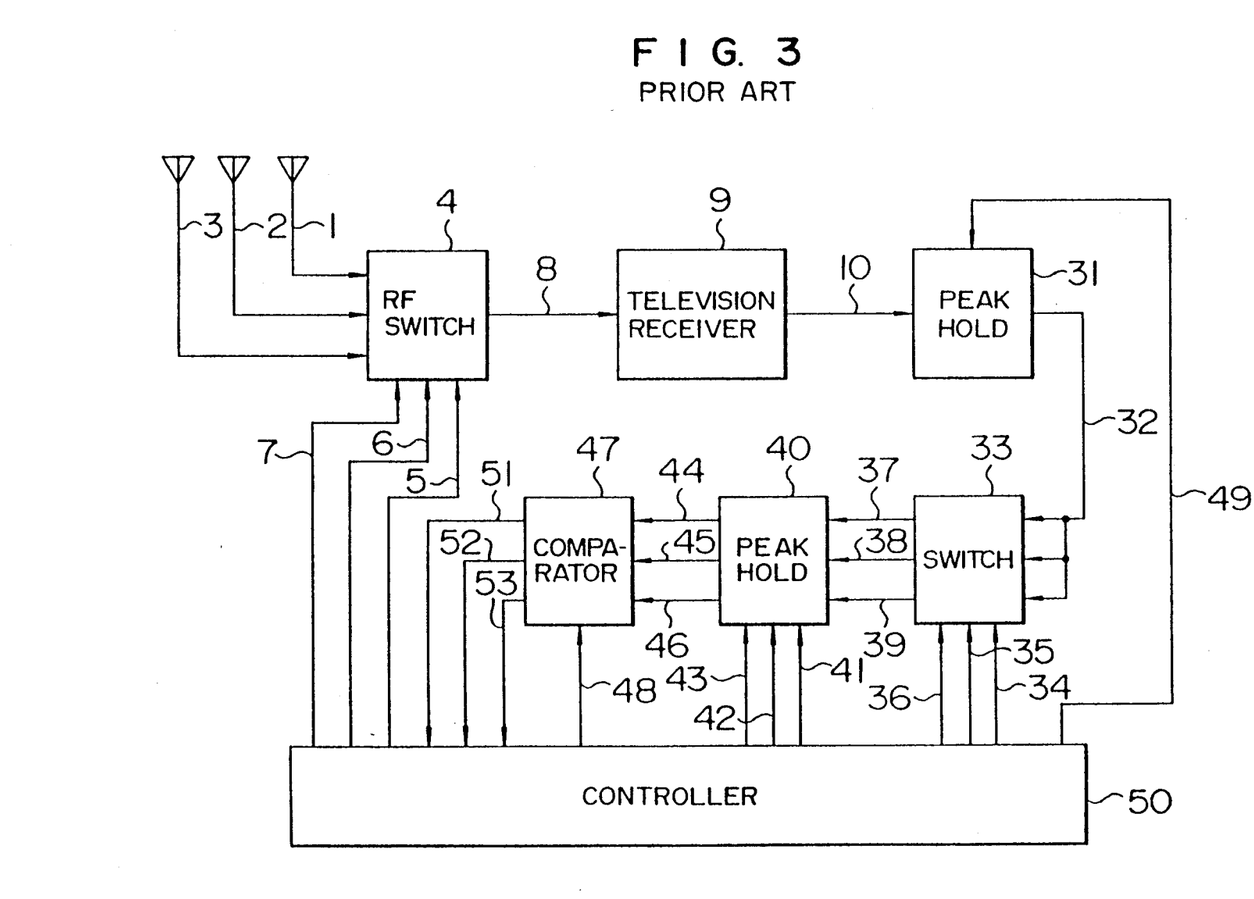
FIG. 3 is a block diagram illustrating a conventional diversity reception apparatus.

As a conventional mobile television diversity reception apparatus, for example, there is known an example disclosed in JP-A-57-14224. FIG. 3 is a block diagram illustrating this diversity reception apparatus.

In FIG. 3, television RF signals 1, 2 and 3 received by respective antennas are led to an RF switch 4. In the RF switch 4, the RF signals 1, 2 and 3 from the antennas are sequentially switched in time division by RF switch driving signals 5, 6 and 7 after a television vertical synchronizing signal in a vertical blanking interval An RF signal 8 switched in the RF switch 4 is supplied to an input terminal of a television receiver 9.

A television video signal 10 is extracted from the television receiver 9 and supplied to a peak hold circuit 31 so that each of the respective levels of the RF signals 1, 2 and 3 subjected to switching is detected from the flat-portion level of the video signal by the first peak hold circuit 31. A detected level signal 32 obtained thus, is sampled in a switch circuit 33 by using level sampling pulses 34, 35 and 36 corresponding to the input RF signals 1, 2 and 3.

Sampled level signals 37, 38 and 39 of the respective antennas are converted into DC-voltage signals 44, 45 and 46 in a second peak hold circuit 40. The reference numerals 41, 42 and 43 represent reset signals for the second peak hold circuit 40, by which a hold voltage is reset before sampling.

In a level comparator 47, the level of each of the DC voltage signals 44, 45 and 46 is compared at a timing of a timing pulse 48 after completion of level sampling, and level comparison signals 51, 52 and 53 (of these three signals, only a signal having the highest level is made to be in a high level, and the other signals are made to be in a low level) are output and combined with a level-sampling RF switch driving signal in a controller 50 so as to produce the RF switch driving signals 5, 6 and 7. As a result, antennas other than the antenna corresponding to the high level signal of the comparison signals 51, 52 and 53 are connected with the television receiver 9 only for a driving period by the RF switch driving signal, while the antenna corresponding to the above-mentioned high level signal is connected with the television receiver 9 for the whole period other than the above driving period.

Reference may be further made to JP-A-57-127339 for a related prior art technology.

SUMMARY OF THE INVENTION

In the above-mentioned configuration, it is possible to realize diversity reception in which levels of a plurality of antennas are compared so that switching is made to select one of the antennas having the maximum reception level.

Since the first peak hold circuit, the sampling switch circuit, the second peak hold circuit and the level comparator are analog circuits comparatively large in circuit size, the above-mentioned prior art has had a problem in miniaturization. In addition, there has been a problem regarding influences upon level comparison accuracy due to attenuation of analog signals in the circuit or the mixture of a pulsative noise from the controller.

In addition, since a noise produced in an audio signal at the time of switching the antenna becomes so much smaller as the period of the switch driving signal for switching the antenna becomes shorter, it is necessary to make the time constant of the second peak hold circuit small to make its response quick, but in this case, there occurs a problem of the switching shoot of the sampling switch circuit and the mixture of a pulsative noise from the controller.

In addition, there has been a problem in that design is very difficult in setting the switch driving timing for switching the antenna, the switch timing for the sampling switch circuit and the time constant of the second peak hold circuit. It has been, therefore, impossible to make the time constant of the second peak hold circuit small, so that, generally, the period of 10 $\mu$s or more has been used as the period of the switch driving signal for switching the antenna.

In this case, there has been a problem that though a noise at the time of switching the antenna is small in monophonic sound, a large noise is produced in stereophonic or auxiliary sound at the time of receiving a sound multiplex broadcasting.

It is therefore an object of the present invention to solve the foregoing problems in the prior art.

It is another object of the present invention to provide a diversity reception apparatus which can be easily made to be a small-sized integrated circuit so as to be optimally mounted on a mobile body, and render it possible to reduce a noise produced in a received sound at the time of switching an antenna.

In order to attain the foregoing objects of the present invention, it is necessary to make the circuit small in size, strong under the existence of a pulsative noise, high in its level comparison accuracy, and high enough in its response speed to cope with a short-period-width switch driving signal for switching the antenna. Accordingly, the diversity reception apparatus according to the present invention comprises: a change-over switch for switching a plurality of receiving antennas so as to connect a selected one of the antennas to a receiver; an A/D converter for converting an analog demodulated signal obtained by the receiver into a digital signal; a switch driving pulse generator for generating a switch driving pulse for switching the change-over switch with respect to the plurality of antennas; a comparator for comparing the demodulated signals obtained by the receiver respectively corresponding to the plurality of antennas after conversion of the demodulated signals into digital signals by the A/D converter to thereby detect a demodulated signal of a highest level and an antenna corresponding the demodulated signal of the highest level; and an antenna switching pulse generator for combining the switch driving pulse supplied from the switch driving pulse generator with an output of the comparator according to a predetermined timing so as to supply a switch driving signal to the change-over switch.

In addition, the pulse width of the switch driving pulse output from the switch driving pulse generator is made not to be less than 3 μs.

In the present invention, the change-over switch switches the plurality of antennas and connects one of those antennas to the receiver. The demodulated analog signal obtained by the receiver is converted by the A/D converter into a digital signal. The switch driving pulse generator generates a switch driving pulse for the change-over switch for switching the plurality of antennas. The comparator compares the demodulated signals supplied from the receiver respectively corresponding to the plurality of antennas and selects a demodulated signal of a highest level and the antenna corresponding thereto. The antenna switching pulse generator combines the switch driving pulse supplied from the switch driving pulse generator with an output of the comparator at a predetermined timing so as to supply switch driving signals to the change-over switch so that those remaining antennas, other than the antenna corresponding to the demodulated signal of the highest level, are connected to the receiver only for a given period in which the switch driving pulse from the switch driving pulse generator is corresponding to each of the remaining antennas, while only the antenna corresponding to the demodulated signal of the highest level is connected to the receiver for a period other than the given period.

Since the level comparison is performed thus with digital signals, it is possible to always select the best antenna with no adverse influence due to the attenuation of analog signals or the mixture of a pulsative noise, so that it is possible to realize level detection with a high-speed response. In addition, it is possible to minimize an antenna-switch noise at the time of receiving a sound multiplex broadcast.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENT

An embodiment of the present invention will be described with reference to the drawings.

Figure 1:
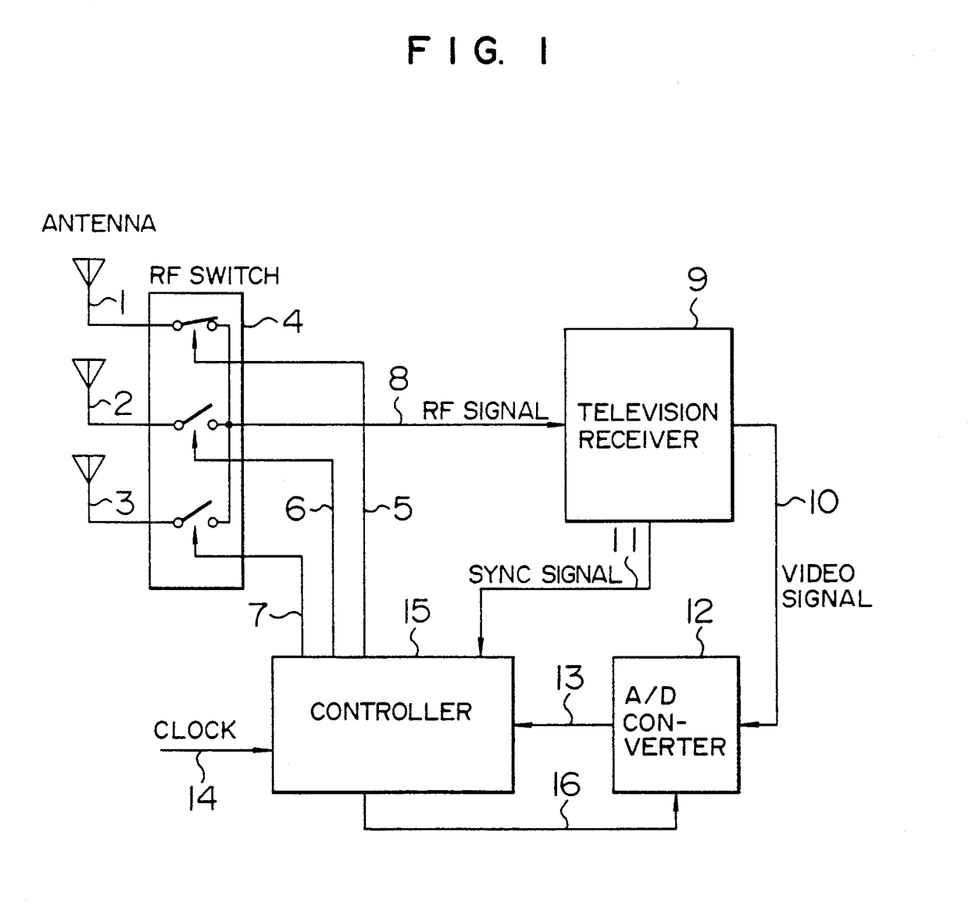
FIG. 1 is a block diagram illustrating an embodiment of the present invention.

FIG. 1 is a block diagram illustrating an embodiment of the present invention. In FIG. 1, reference numerals 1, 2 and 3 represent respective television RF signals received by three antennas, 4 represents an RF switch for switching the RF signals, 9 represents a television receiver, 12 represents an A/D converter, and 15 represents a controller.

The television RF signals 1, 2 and 3 received by the respective antennas are led into the RF switch 4. In the RF switch 4, the RF signals 1, 2 and 3 are sequentially switched in time division by RF switch driving signals 5, 6 and 7 in an equalizing period or the like immediately after a vertical synchronizing signal period in a television vertical blanking interval. An RF signal 8 switched in the RF switch 4 is supplied to an input terminal of the television receiver 9.

A television video signal 10 demodulated by the television receiver 9 is supplied to the A/D converter 12. The A/D converter 12 converts the television video signal 10 into a digital video signal 13 and supplies the digital video signal 13 to the controller 15 whenever a sampling clock 16 is supplied from the controller 15.

Figure 2:
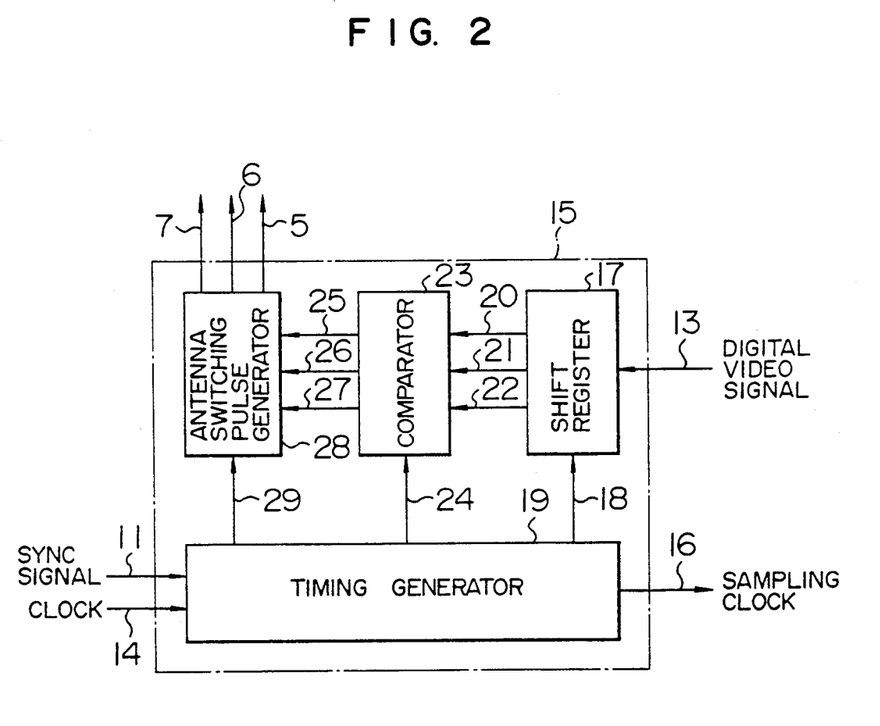
FIG. 2 is a block diagram illustrating a specific example of the controller in FIG. 1.

FIG. 2 is a block diagram illustrating a specific example of the controller 15. The controller 15 is constituted by a shift register circuit 17, a data comparator 23, an antenna switching pulse generator 28 and a timing generator 19.

The timing generator 19 generates the sampling clock 16 on the basis of a television synchronizing signal (horizontal or vertical synchronizing signal) 11 supplied from the television receiver 9 and a control clock 14, and supplies the sampling clock 16 to the A/D converter 12 with the same period as the switching timing of the RF switch 4 which is switched in time division in a vertical blanking interval of a television signal.

In the A/D converter 12 in FIG. 1, therefore, the television video signal 10 which corresponds in time division to the input levels of the respective antennas is converted into the digital video signal 13. The shift register circuit 17 converts the time-divisionally supplied digital video signal 13 from series to parallel on the basis of a shift register clock 18 supplied from the timing generator 19 correspondingly to the switching timing of the RF switch 4 so that the shift register circuit 17 obtains digital data 20, 21 and 22 corresponding to the input levels of the respective input RF signals 1, 2 and 3 of the three antennas.

The digital data 20, 21 and 22 are supplied to a data comparator 23 in which the levels of the respective digital data 20, 21 and 22 are compared with each other at the time of a comparison timing pulse 24 generated after the timing of completion of switching of the three antennas in the RF switch 4. The data comparator 23 outputs comparison signals 25, 26 and 27 which are corresponding to the levels of the RF signals 1, 2 and 3 of the three antennas, in a manner such that, for example, if the level of the RF signal 1 is the maximum one of those levels, the data comparator 23 outputs an "H" level as the comparison signal 25, and outputs an "L" level as the comparison signals 26 and 27.

The antenna switching pulse generator 28 for generating a switching pulse combines a switch driving pulse signal 29 for switching the three antennas sequentially in time division in a vertical blanking interval with the comparison signals 25, 26 and 27 supplied from the data comparator 23 to thereby generate the RF switch driving signals 5, 6 and 7.

Figure 4:
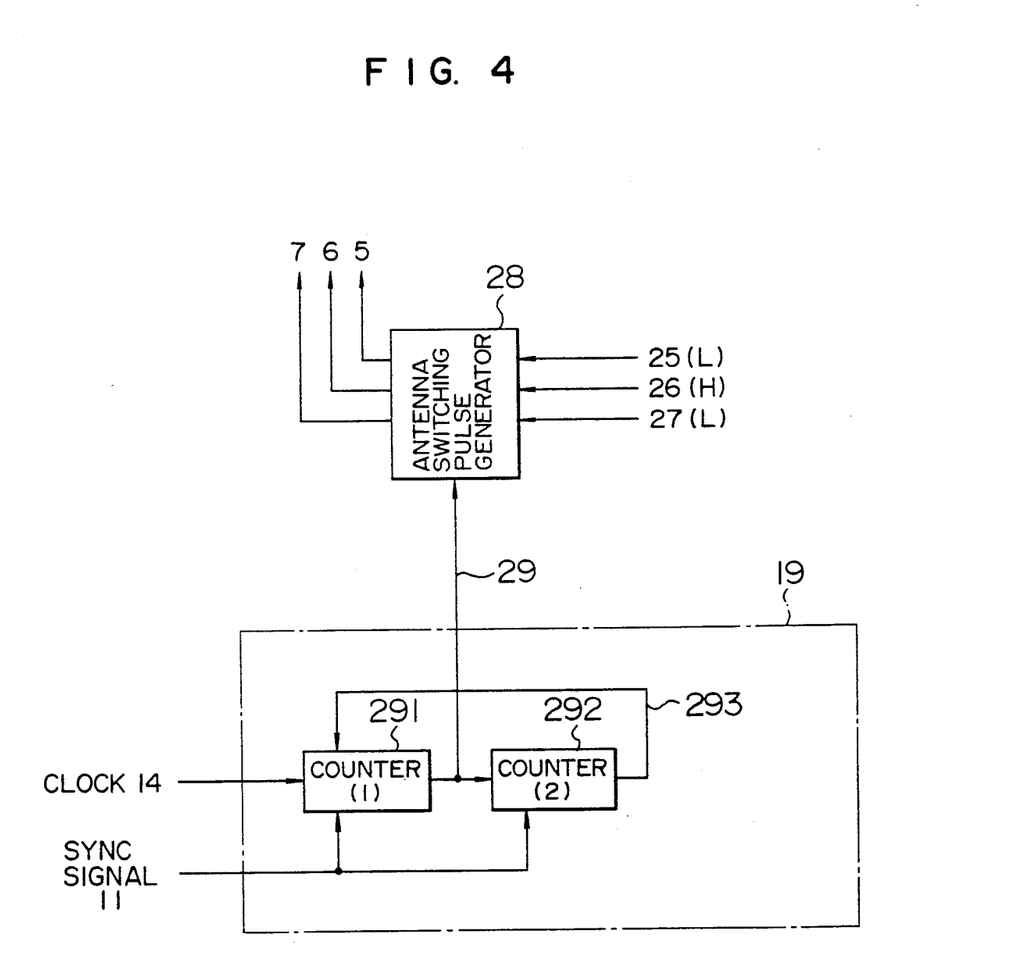
FIG. 4 is a block diagram illustrating a specific example of a switch driving pulse signal generator in the timing generator in FIG. 2.

FIG. 4 is a block diagram illustrating a specific example of a circuit as a generator for generating the switch driving pulse signal 29 output from the timing generator 19 in FIG. 2, and a specific example of the combining operation in the antenna switching pulse generator 28.

In FIG. 4, the generator of the switch driving pulse signal 29 is constituted by a counter-1 291 and a counter-2 292.

Figure 5:
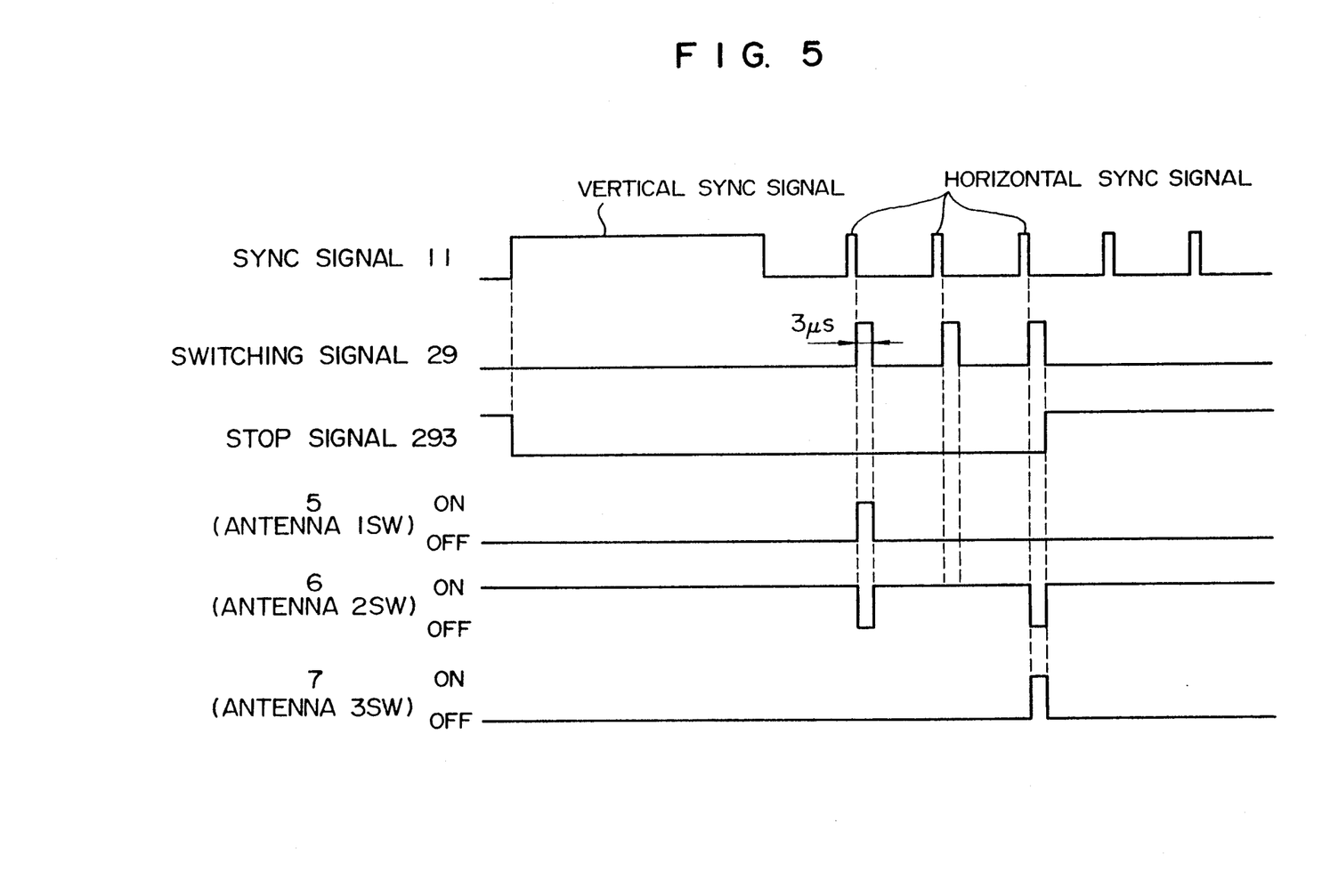
FIG. 5 is a timing chart of signals of respective parts of FIG. 4.

FIG. 5 is a timing chart illustrating signals at various parts in the circuit of FIG. 4.

The circuit operation will be described with reference to FIGS. 4 and 5.

In FIG. 4, the counter-1 291 is reset by a horizontal synchronizing signal of the television synchronizing signal 11, counts the control clock 14 for a predetermined period and outputs a predetermined-width pulse signal (the switch driving pulse signal 29) during the period. The counter-2 292 is reset by a vertical synchronizing signal of the television synchronizing signal 11, and outputs a stop signal 293 for stopping the operation of the counter-1 291 after counting a predetermined number of output pulses 29.

Now assume that as the control clock 14, used is a clock of about 14.3 MHz which can be obtained by a means not-shown, for example, for multiplying a television color subcarrier by four. The counter-1 291 counts the control clock 14 43 times after reset by a horizontal synchronizing signal. In this duration, that is, during the time of (1/14.3 MHz)×43=3 μs, the counter-1 291 outputs the switch driving pulse signal 29 of the "H" level, and after the termination of the counting, it does not produce any output. Thus, the counter-1 291 outputs the switch driving pulse signal 29 of the width 3 μs in the same manner whenever the counter-1 291 is reset by a horizontal synchronizing signal supplied thereto sequentially.

On the other hand, when the counter-2 292 has counted the trailing edge of the switch driving pulse signal 29 of the counter-1 291 three times after reset by a vertical synchronizing signal, the counter-2 292 outputs a stop signal 293. For the period the stop signal 293 is in the "H" level, the counter-1 291 stops its operation. Upon input of the next vertical synchronizing signal, the counter-2 292 is reset and the stop signal 293 returns to the "L" level, so that the counter-1 291 starts the counting operation again immediately after input of a horizontal synchronizing signal thereafter.

By the above operation, it is possible to generate the switch driving pulse signal 29 having the width of about 3 μs for switching the three antennas in a television vertical blanking interval.

In the antenna switching pulse generator 28 for generating a switching pulse, the switch driving pulse signal 29 is combined with the comparison signals 25, 26 and 27 obtained by the level comparison of the three antennas so that the respective RF switch driving signals 5, 6 and 7 are generated.

FIG. 5 shows a timing chart of the respective RF switch driving signals 5, 6 and 7 in the case where the input of the antenna 2 is judged to have the maximum level (that is, the comparison signal 26 is "H", and the other comparison signals are "L"), so that the antenna 2 is selected.

That is, since the RF switch driving signal 5 corresponds to the antenna 1 the input level of which is not the maximum, the level of the RF switch driving signal 5 is high (H) only for the period of 3 μs corresponding to the first switch driving pulse signal 29 so that the antenna 1 is connected to the television receiver 9 in the period. The RF switch driving signal 5 corresponding to the antenna 3 which is not in the maximum level has also a high (H) level only for 3 μs corresponding to the last switch driving pulse signal 29, so that the antenna 3 is connected to the television receiver 9 in this period.

On the other hand, the RF switch driving signal 6 corresponding to the antenna 2 which is in the maximum level has a low (L) level for the period when the RF switch driving signal 5 or 7 is in the high (H) level, and has a high (H) level for the remainder period so that the antenna 2 is connected to the television receiver 9 in this period.

In other words, as a result of combination of the comparison signals 25(L), 26(H) and 27(L) with the switch driving pulse signal 29 (three pulses of the pulse width 3 μs), the antenna switching pulse generator 28 generates and outputs the above-mentioned RF switch driving signals 5, 6 and 7.

Figure 6:
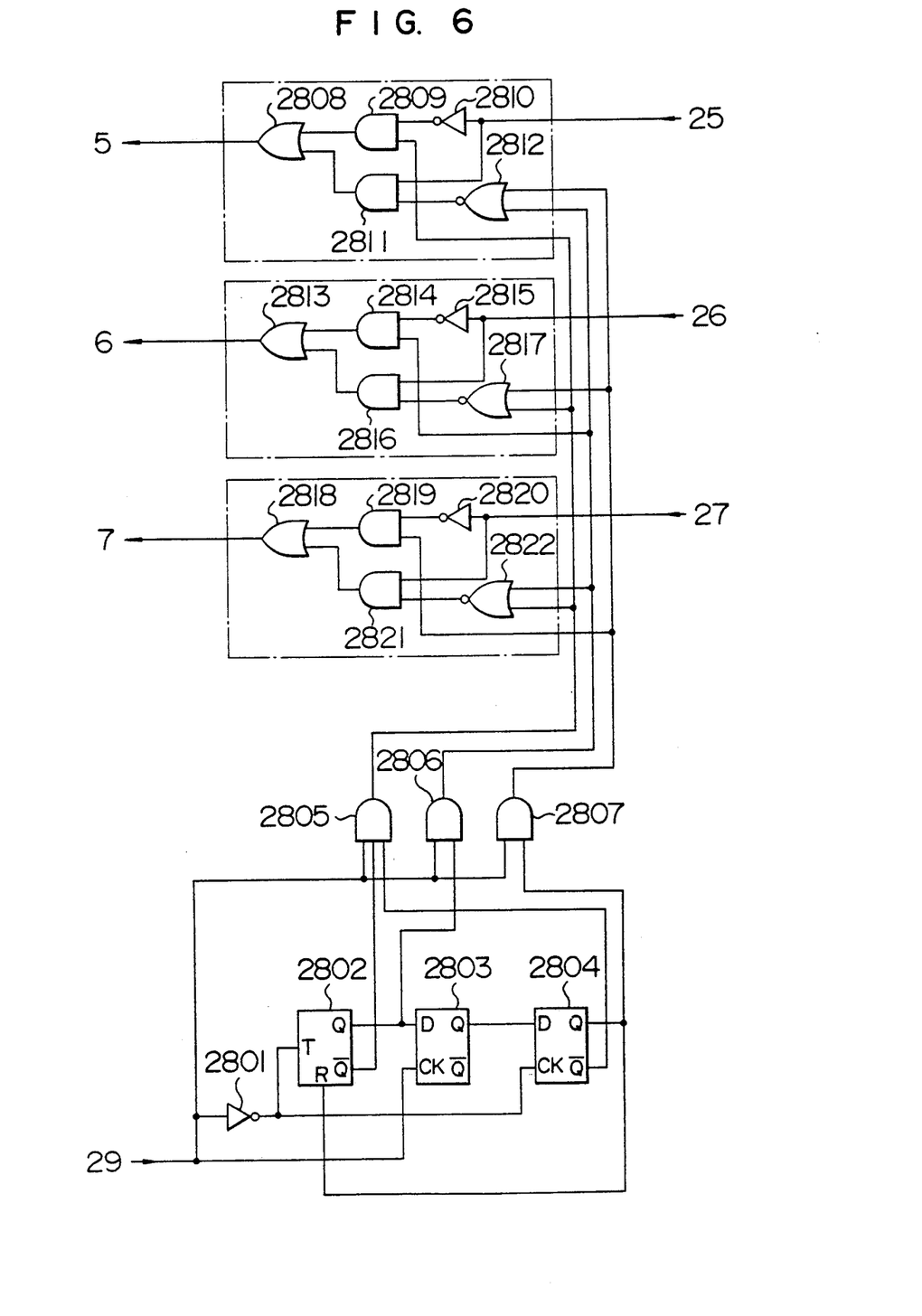
FIG. 6 is a circuit diagram illustrating a specific example of the antenna switching pulse generator in FIG. 4.
Figure 7:
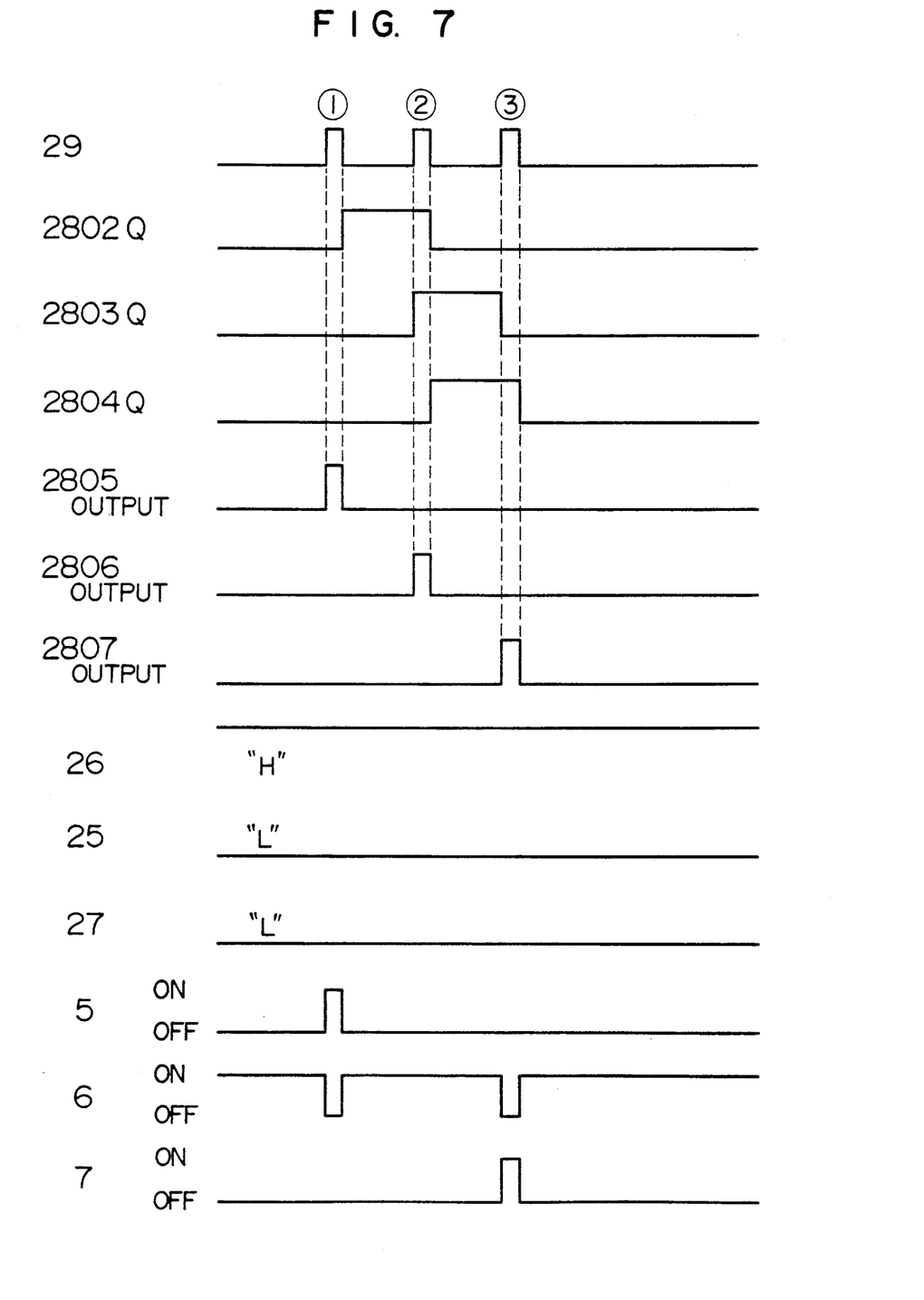
FIG. 7 is a timing chart of signals of main parts of FIG. 6.

FIG. 6 is a circuit diagram illustrating a specific example of the antenna switching pulse generator 28 in FIG. 4, and FIG. 7 is a timing chart of signals at main parts thereof. The circuit operation will be described with reference to both the drawings.

The switch driving pulse signal 29 is converted into switch timing pulses corresponding to the antenna 1, 2 and 3 respectively. The switch driving pulse signal 29 is inverted in an invertor 2801 (hereinafter abbreviated to "INV 2801"), and at the leading edge thereof an output Q of a T-type flip-flop 2802 (hereinafter abbreviated to "T-FF 2802") changes from the "L" level to the "H" level. The D-type flip-flop 2803 (hereinafter abbreviated to "D-FF 2803") receives the output Q of the T-FF 2802, and changes its output Q from the "L" level into the "H" level at the leading edge of the ② switch driving pulse signal 29.

Further a D-FF 2804 receives the output Q of the D-FF 2803, and changes its output Q from the "L" level to the "H" level at the trailing edge of the ② switch driving pulse signal 29. For the time when the output Q of the D-FF 2804 is in "H", the output Q of the T-FF 2802 is reset and changes into the "L" level. Thus, the above-mentioned three FFs produce their output signals at the timing shown in FIG. 7.

The outputs of the above-mentioned FFs and the switch driving pulse signal 29 are converted into three timing pulses by AND circuits 2805, 2806 and 2807 respectively. The respective timing pulses are combined with the comparison outputs 25, 26 and 27 corresponding to the antenna 1, 2 and 3 so as to generate the switch driving signals 5, 6 and 7, respectively.

Now assuming the input level of the antenna 2 is the maximum, the comparison outputs 25, 26 and 27 are in an "L" level, in an "H" level, and in an "L" level, respectively, and the antenna switching pulse generator constituted by logical gates 2808 to 2822 combines these signals with the output signals of the above-mentioned AND circuits 2805, 2806 and 2807, thereby producing the switch driving signals 5, 6 and 7 having polarities as shown in FIG. 7.

Although three antennas are switched sequentially by the width of 3 μs in a vertical blanking interval in the above embodiment, if the number counted by the counter-1 291 is made smaller than 43, it is easily possible to generate pulses of the width shorter than 3 μs.

In addition, if the number counted by the counter-2 292 is made to be larger than 3, it is easy to make it possible to generate more than three antenna switching pulses.

According to the above-mentioned apparatus shown in FIGS. 1 and 2, it is possible to realize diversity reception in which the level comparison of a plurality of antennas is performed with a high accuracy in a short time by a comparatively simple circuit, so that the antenna is switched to the one having the maximum level.

In addition, since all the input and output signals of the controller 15 can be made digital ones, it is possible to constitute the controller 15 by logical circuits, and it is therefore possible to make the controller 15 to be a small-sized integrated circuit.

Figure 8:
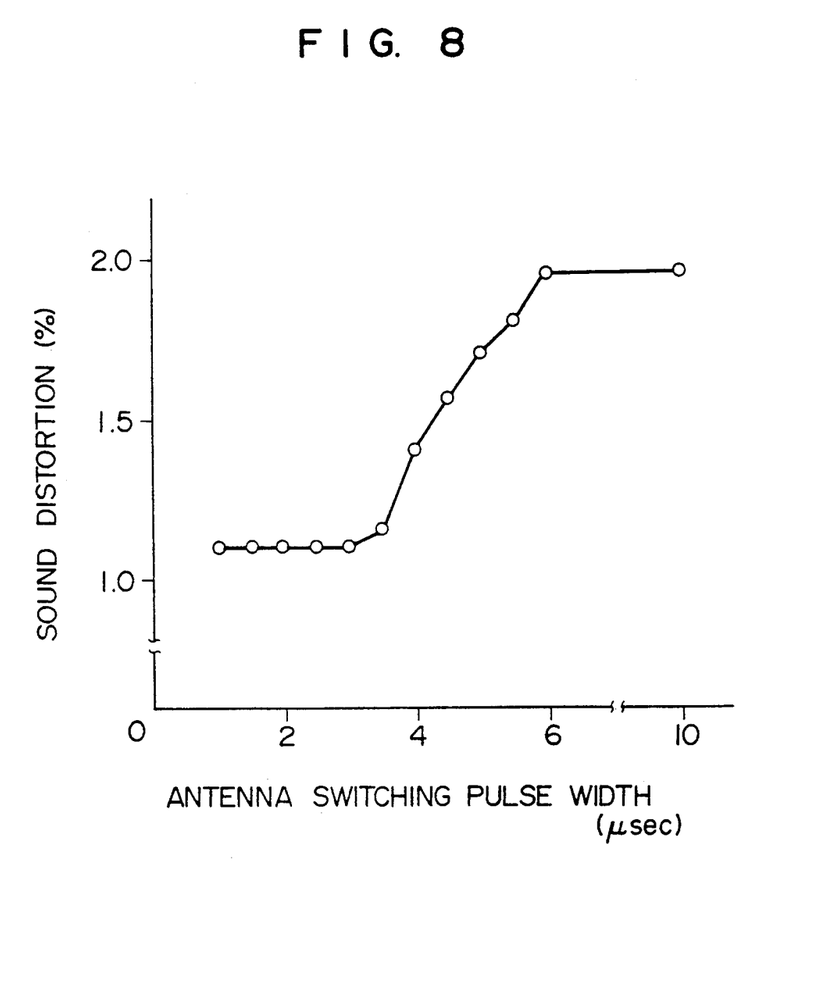
FIG. 8 is a data diagram illustrating the relationship between the antenna switch driving pulse width and the sound distortion rate.

FIG. 8 is a measured data diagram illustrating the relationship between the width of an antenna switch driving pulse and the distortion rate of a sound signal. The sound signal was obtained by demodulating a sound multiplex signal of a sine wave of 1 KHz. A diversity reception apparatus used for the measurement had four systems of antenna inputs, and the sound distortion was measured while inputting RF signals into only one of the systems.

From FIG. 8, it is understood that an antenna-switching noise entering stereophonic and auxiliary sounds at the time of receiving a sound multiplex broadcasting wave has a serious relationship with the pulse width of the switch driving pulse signals 5, 6 and 7, and if the pulse width is made narrower than the conventional 10 $\mu s$, particularly not more than 3 $\mu s$, the noise is small enough and improved enough to have no problem in practical use.

If the A/D converters in the present invention, for example, which are used in a digital television receiver or the like and which are capable of performing high-speed sampling of about the four-times of fsc (14.3 MHz) are employed, the level detection at the time of switching antennas can be made at a high speed of about 70 ns, and can follow the high-speed switching of antennas, so that it is easy to make it possible to realize high-speed switching not more than 3 $\mu s$, and it is possible to make an antenna-switching noise entering a sound at the time of receiving a sound multiplex broadcasting small enough. Further, it is also possible to make the circuit design easy.

Thus, according to the present invention, since the input level comparison of respective antenna is performed after a demodulated signal of a receiver is converted into a digital signal, adverse effects given to an analog signal such as signal attenuation and the mixture of noise is reduced, allowing level comparison to be performed with a high accuracy and at a high speed. Further, there is an effect that it is possible to shorten the time to switch antennas for the level comparison, making a switching noise given to a demodulated sound signal less conspicuous.

In addition, since the controller is comprised of a logical circuit, it can be easily fabricated into an integrated circuit, and therefore the apparatus can be miniaturized, so that it is possible to provide a diversity reception apparatus which is suitable to be mounted on a mobile body.

What is claimed is:

1. A diversity reception apparatus comprises:
   a plurality of receiving antennas;
   a receiver for receiving an analog demodulated broadcasting signal;
   an A/D converter for converting said analog demodulated signal from said receiver into a digital signal;
   a change-over switch for selecting one of said plurality of receiving antennas and connecting said selected receiving antenna to said receiver;
   a switch driving pulse generator for generating a switch driving pulse for sequentially selecting one of said plurality of receiving antennas;
   a comparator for comparing demodulated signals output by said A/D converter which are obtained when said plurality of receiving antennas are sequentially connected to said A/D converter to thereby detect a receiving antenna corresponding to a demodulated signal of the highest level; and
   control means responsive to said switch driving pulse and an output of said comparator, for controlling said change-over switch so that said receiving antenna corresponding to said demodulated signal of the highest level is selected for a period of time in which said switch driving pulse is absent while a receiving antenna corresponding to said switch driving pulse is selected for a period in which said switch driving pulse is received by said control means;
   wherein the pulse width of said switch driving pulse output from said switch driving pulse generator is no longer than 3 $\mu s$.

2. A method of removing audio distortion from a diversity reception apparatus having a plurality of receiving antennas, said method comprising the steps of:
   receiving an analog demodulated broadcasting signal from said receiving antennas into receiving means;
   converting said analog demodulated signal into a digital signal;
   selecting one of said plurality of receiving antennas;
   connecting said selected receiving antenna to said receiving means;
   generating a switch driving pulse;
   sequentially selecting each of said plurality of receiving antennas according to said generated switch driving pulse;
   comparing the digital signals with one another to thereby detect a receiving antenna corresponding to a demodulated signal of the highest level; and
   controlling said selection of a receiving of antenna of said plurality of receiving antennas such that a receiving antenna corresponding to said demodulated signal of the highest level is selected for a period of time during which said switch driving impulse is absent, while a receiving antenna corresponding to said switch drive impulse is selected for a period of time during said switch driving pulse is received by said control means,
   wherein a period of time for which one of said receiving antenna is selected in response to a corresponding switch drive impulse is no longer than three (3) microseconds.

* * * * *